US011945451B2

(12) United States Patent
Zeh et al.

(10) Patent No.: US 11,945,451 B2
(45) Date of Patent: Apr. 2, 2024

(54) ELECTRONIC ANOMALY DETECTION UNIT FOR USE IN A VEHICLE, AND METHOD FOR DETECTING AN ANOMALY IN A COMPONENT OF A VEHICLE

(71) Applicant: Infineon Technologies AG, Neubiberg (DE)

(72) Inventors: Alexander Zeh, Munich (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 523 days.

(21) Appl. No.: 16/509,639

(22) Filed: Jul. 12, 2019

(65) Prior Publication Data

US 2020/0023858 A1    Jan. 23, 2020

(30) Foreign Application Priority Data

Jul. 17, 2018 (DE) .......................... 102018211844.2

(51) Int. Cl.
*B60W 50/02* (2012.01)
*B60W 50/04* (2006.01)

(52) U.S. Cl.
CPC ........ *B60W 50/0205* (2013.01); *B60W 50/04* (2013.01); *B60G 2800/80* (2013.01); *B60W 2050/021* (2013.01); *B60W 2510/18* (2013.01)

(58) Field of Classification Search
CPC ..................... B60W 2050/021; B60G 2800/80
(Continued)

(56) References Cited

U.S. PATENT DOCUMENTS 6,725,407 B2    4/2004 Richter et al.
6,820,220 B1    11/2004 Dominke et al.
(Continued)

FOREIGN PATENT DOCUMENTS

DE    19902031 A1    7/2000
DE    102011109426 A1    12/2012
(Continued)

OTHER PUBLICATIONS

Elektrobit, "Vehicle Communication: Infineon and Elektrobit Improve Data Security in the Car". [online] [Retrieved from the internet Jun. 27, 2019] URL: <https://www.elektrobit.com/newsroom/vehicle-communication-infineon-elektrobit-improve-data-security-car/>.
(Continued)

*Primary Examiner* — Jacob S. Scott
*Assistant Examiner* — Michael E Butler
(74) *Attorney, Agent, or Firm* — Harrity & Harrity, LLP (57) ABSTRACT

An electronic anomaly detection unit for use in a vehicle includes an input component for capturing an input variable, wherein the input variable contains state information for at least one component of the vehicle, a memory component for storing state values based on the input variable, a selection component for selecting selected state values from the stored state values, an association component for associating the selected state values with predefined values, wherein the predefined values define a normal state of the component of the vehicle, and a decision component for deciding whether there is an anomalous behavior in the at least one component of the vehicle, based on the association, wherein one or more of the input component, the memory component, the selection component, the association component and the decision component are implemented in hardware.

18 Claims, 4 Drawing Sheets

(58) Field of Classification Search
USPC .............................................................. 701/1
See application file for complete search history.

(56) References Cited

U.S. PATENT DOCUMENTS

| | | | |
|---|---|---|---|
| 9,547,944 B2 | 1/2017 | Nelson et al. | |
| 10,142,189 B2 | 11/2018 | Zinner et al. | |
| 2005/0273653 A1* | 12/2005 | Zubkow | G06F 11/181 |
| | | | 714/11 |
| 2008/0129241 A1* | 6/2008 | Yu | H02P 29/032 |
| | | | 318/605 |
| 2017/0013005 A1* | 1/2017 | Galula | H04L 63/20 |
| 2017/0139411 A1* | 5/2017 | Hartung | G05D 1/0077 |

FOREIGN PATENT DOCUMENTS

| | | |
|---|---|---|
| DE | 102013214577 A1 | 1/2015 |
| EP | 1087233 A1 | 3/2001 |

OTHER PUBLICATIONS

Infineon Technologies AG, "Your Path to Robust and Reliable In-Vehicle Networking". [online] [Retrieved from the internet Jun. 27, 2019] URL: <https://www.infineon.com/dgdl/Infineon-Automotive%20Networking_2016-ABR-v01_00-EN.pdf?fileId=5546d462584d1d4a0158870bebb45f12>.

* cited by examiner

ELECTRONIC ANOMALY DETECTION UNIT FOR USE IN A VEHICLE, AND METHOD FOR DETECTING AN ANOMALY IN A COMPONENT OF A VEHICLE

RELATED APPLICATION

This application claims priority to German Patent No. 102018211844.2, filed on Jul. 17, 2018, which is incorporated herein by reference in its entirety.

FIELD

The present disclosure relates to an electronic anomaly detection unit for use in a vehicle and to a method for detecting an anomaly in a component of a vehicle.

BACKGROUND

Owing to technical progress, the type and scope of electronic subassemblies installed in a vehicle, that is to say an aircraft, watercraft or land vehicle, in particular a motor vehicle such as a passenger vehicle or truck, have greatly expanded and are also still expanding further. Examples of electronic subassemblies of this kind are for example electronic control units, sensors, actuators, etc. This expansion is accompanied by an increase in the communication of these electronic subassemblies among one another or with further subassemblies or else with transmitters/receivers outside the vehicle. In particular, this is true of motor vehicles that are designed for autonomous driving or have driver assistance systems.

It is expedient to protect the communication of the electronic subassemblies from anomalies, which include randomly occurring faults and intentional attacks. Such protection needs to take place in real time and in a predefined, deterministic cycle, however, and should not trigger a false alarm in the process, but at the same time should also not miss any anomalies, which is possibly not the case with conventional anomaly detection units. In particular, conventional anomaly detection units are pure software modules, which is possibly not optimum in regard to the aforementioned area of conflict of in some cases contradictory requirements. It is therefore necessary to provide an improved anomaly detection unit.

The object on which the invention is based is achieved by the features of the independent patent claims. Advantageous configurations and developments of the invention are specified in the subclaims.

SUMMARY

One aspect of the disclosure relates to an electronic anomaly detection unit for use in a motor vehicle, the anomaly detection unit including an input component for capturing an input variable, wherein the input variable contains state information for at least one component of the motor vehicle, a memory component for storing state values based on the input variable, a selection component for selecting selected state values from the stored state values, an association component for associating the selected state values with predefined values, wherein the predefined values define a normal state of the at least one component of the motor vehicle, and a decision component for deciding whether there is an anomalous behavior in the at least one component of the motor vehicle, based on the association, wherein one or more of the input component, the memory component, the selection component, the association component and the decision component are implemented in hardware.

A further aspect of the disclosure relates to a method for detecting an anomaly in at least one component of a motor vehicles, the method including capturing an input variable using an input component, wherein the input variable contains state information for at least one component of the motor vehicle, storing state values using a memory component, the state values based on the input variable, selecting selected state values from the stored state values using a selection component, associating the selected state values with predefined values using an association component, wherein the predefined values define a normal state of the least one component of the motor vehicle, and deciding, using a decision component, whether there is an anomalous behavior in the least one component of the motor vehicle, based on the association.

BRIEF DESCRIPTION OF THE DRAWINGS

The accompanying drawings depict examples and, together with the description, serve to explain the aspects of the disclosure. The elements of the drawings are not necessarily to scale in relation to one another. Identical reference signs can denote mutually corresponding, similar or identical parts.

DETAILED DESCRIPTION

Figure 1:
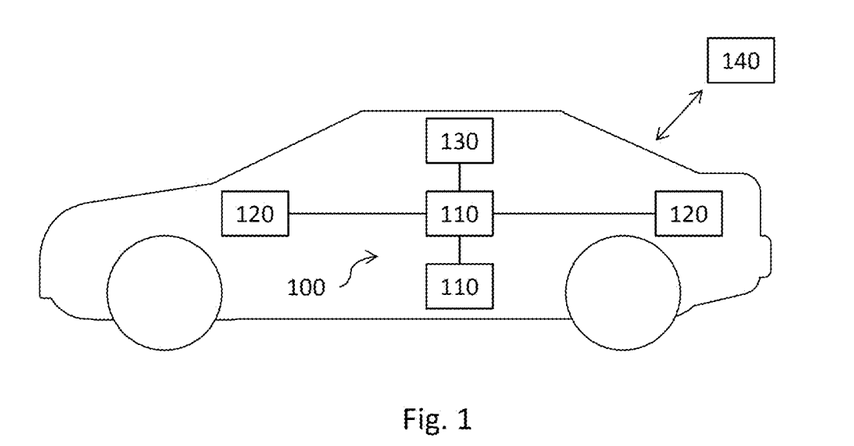
FIG. 1 shows an outline depiction of a communication network in a motor vehicle, wherein the communication network comprises a control unit having an electronic anomaly detection unit.

FIG. 1 shows, in outline form, a motor vehicle having an electronic communication network 100 that is used for the communication of electronic subassemblies (electronic components) of the motor vehicle among one another or with transmitters/receivers outside the motor vehicle. The communication network 100 can comprise one or more electronic control units (ECUs) 110. The communication network. 100 can, besides this, comprise one or more further electronic components of the motor vehicle 120. These further components 120 can be e.g. sensors such as for example speed sensors, pressure sensors, radar sensors, etc., or data memories or processors or radio transceivers or actuators or any other electronic subassemblies. The communication network 100 can also have a server 130 connected to the control unit 110 or the control units 110. It is further conceivable for a motor vehicle to have multiple mutually independent communication networks 100.

The communication network 100 can meet one or more of the following standards, for example:
- ISO 11898, "Road Vehicles—Controller Area Network (CAN)",
- ISO 17458, "Road vehicles—FlexRay communications system",
- IEEE 802.1AS-2011, "IEEE Standard for Local and Metropolitan Area Networks—Timing and Synchronization for Time-Sensitive Applications in Bridged Local Area Networks",
- IEEE SA—802.3bw-2015, "IEEE Standard for Ethernet Amendment 1: Physical Layer Specifications and Management Parameters for 100 Mb/s Operation over a Single Balanced Twisted Pair Cable (100BASE-T1)", and
- "PCI Express Base Specification Revision 3.0," Peripheral Component Interconnect Special Interest Group PCI-SIG, November 2010.

The control unit(s) 110 may be designed as nodes of the communication network 100. A control unit 110 can comprise one or more microprocessors and may be a microcontroller unit (MCU).

The communication in the communication network 100 can take place in encrypted fashion or in encrypted and authenticated fashion. This can help to ensure the integrity and confidentiality of data sent, received or stored in the communication network, in particular in the control unit 110.

The control unit 110 has an anomaly detection unit as described more specifically later on. The term "anomaly detection unit" (anomaly detection system, ADS) can be regarded as an umbrella term for an "attack detection unit" (intrusion detection system, IDS). Whereas an IDS is designed to detect malicious penetration of a communication network, an ADS may, besides this, be designed to detect naturally occurring faults, such as those occurring as a result of the ageing of subassemblies or as a result of damage, for example, in the communication network 100 or the control unit 110.

The server 130 can be designed to store one or more configurations of the anomaly detection unit in a database and to make them available to the anomaly detection unit when required. The respective configuration of the anomaly detection unit can be dependent on the present status of the motor vehicle, e.g. on the present driving situation such as starting, accelerating, braking, cornering, etc.

According to one example, the server 130 can also be arranged outside the motor vehicle as an external server 140, wherein there is a wireless connection between the communication network 100 inside the motor vehicle and the external server 140. The external server 140 can be designed to be connected to more than one motor vehicle.

Figure 2:
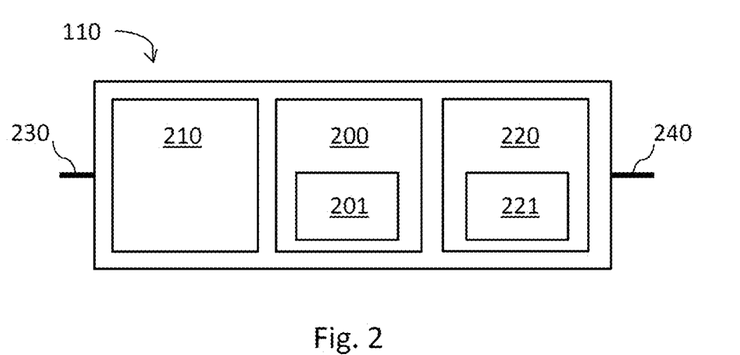
FIG. 2 shows an enlarged outline depiction of the control unit from FIG. 1.

FIG. 2 shows an outline enlarged depiction of the control unit 110 from FIG. 1. The control unit 110 comprises an anomaly detection unit 200. The control unit 110 further has a connection 230 by means of which the control unit 110 is connected to the communication network 100 (not shown) and can send and/or receive signals. E.g. a component 120 to be monitored or controlled by the control unit 110, such as a sensor or actuator (not shown), may be connected to the control unit 110 via the connection 230. The control unit 110 can further have a further connection 240, by means of which it may be connected to a further component 120 to be monitored or controlled or to the server 130 (not shown).

The connection 230 and/or the connection 240 may be connected in the control unit 110 to a communication component 210. The connection 230 and/or the connection 240 can be a wire-based connection, a waveguide-based connection (for communication by means of radar or microwaves) or a wireless connection.

The communication component 210 of the control unit 110 can be designed to receive data from the communication network 100 and/or to send data from the control unit 110 to the communication network 100.

The anomaly detection unit 200 may be implemented wholly or in part in hardware. An example of such an anomaly detection unit 200 is described in more detail later on—in connection with FIGS. 3 to 5.

According to one example, the control unit 110 can further have a software-implemented anomaly detection unit or level 2 anomaly detection unit 220.

In this case, the anomaly detection unit 200 can also be referred to as a level 1 anomaly detection unit.

The level 1 anomaly detection unit can be designed to send evaluation signals to the level 2 anomaly detection unit and/or to receive control signals therefrom. The level 2 anomaly detection unit can be designed to send evaluation signals to the level 3 anomaly detection unit and/or to receive control signals therefrom.

According to one example, the communication network 100 can have a further software-implemented anomaly detection unit or level 3 anomaly detection unit ("Big Data" anomaly detection unit) that can be implemented e.g. in the external server 140. The level 2 anomaly detection unit can be embodied in a platform protected against illegal changes (secure element). The level 2 anomaly detection unit can comprise a hardware security module (HSM).

The level 3 anomaly detection unit can be designed to detect anomalies at the level of a vehicle fleet, which can include e.g. distances between individual vehicles, speeds of individual vehicles, etc. The level 3 anomaly detection unit can be designed to interchange information with the level 1 anomaly detection unit and/or with the level 2 anomaly detection unit. In this manner, it is possible for e.g. a distance value between two vehicles that is checked by the level 3 anomaly detection unit to be compared with a sensor value for the distance that is checked by the level 1 anomaly detection unit.

The anomaly detection unit 200 can comprise a database 201 in which one or more configurations of the anomaly detection unit 200 can be stored. The level 2 anomaly detection unit 220 can comprise a database 221 in which one or more configurations of the level 2 anomaly detection unit can be stored.

According to one example, a combined anomaly detection unit can comprise a level 1 anomaly detection unit integrated wholly or in part in hardware and a level 2 anomaly detection unit integrated in software, wherein said anomaly detection units work together to detect an anomaly. The combined anomaly detection unit can further comprise a level 3 anomaly detection unit that works together with the level 1 anomaly detection unit and the level 2 anomaly detection unit.

The anomaly detection unit 200 can be configured to signal to further components of the control unit 110 that a fault has been detected or that a fault has not been detected. The control unit 110 can be configured to signal a detected fault or non-detection of a fault to the communication network 100.

The anomaly detection unit 200 or the combined anomaly detection unit can be designed to detect faults at different organizational levels of the communication network 100, e.g. at the level inside the control unit 110, at, the level inside the motor vehicle and at the level between individual motor vehicles.

At the level inside the control unit 110, it is possible e.g. for a processor utilization level or a memory consumption or a power consumption to be monitored by the anomaly detection unit 200 or by the anomaly detection unit 200 and the level 2 anomaly detection unit 220 and compared with standard values that are valid for the present state of the motor vehicle. The standard values may be stored in the configuration of the anomaly detection unit 200 and of the level 2 anomaly detection unit 220 that is valid for the present state of the motor vehicle.

In a comparable manner, at the level inside the motor vehicle, the anomaly detection unit 200 or the anomaly detection unit 200 and the level 2 anomaly detection unit 220 can compare e.g. shock absorber control of the wheels during cornering with standard values valid for this cornering.

At the level between individual motor vehicles, e.g. a distance from the motor vehicle in front or behind, which is ascertained by a radar sensor, can be compared with plausible values by the anomaly detection unit 200 or the anomaly detection unit 200 and the level 2 anomaly detection unit 220 or the anomaly detection unit 200, the level 2 anomaly detection unit 220 and the level 3 anomaly detection unit.

According to one example, the anomaly detection unit 200, to be more precise the configuration of the anomaly detection unit 200, can be designed to be updated. The update process can be restricted to a specific update mode of the control unit 110, in which a requisite measure of security is provided. Transmission and storage (e.g. in a database of the server 130) of the configuration data can be cryptographically protected. The configuration data can be protected by means of error-correcting code. The configuration data can comprise e.g. entries, wherein each entry can comprise a parameter P and an associated predefined value T (cf. FIG. 4A).

Figure 3:
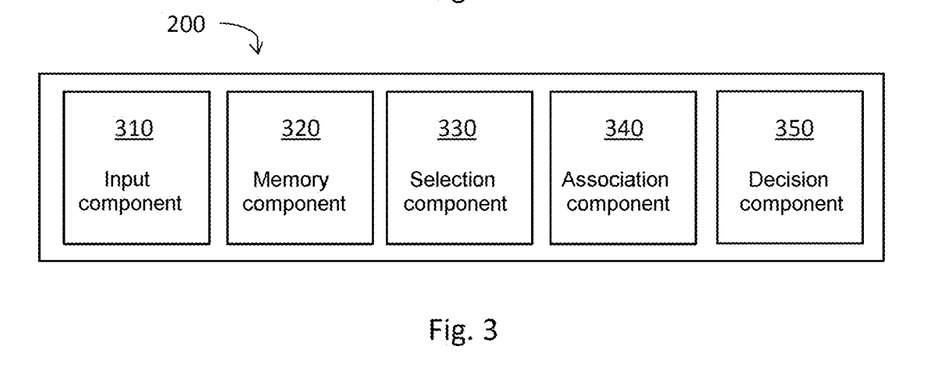
FIG. 3 shows an enlarged outline depiction of the anomaly detection unit from FIG. 2.

FIG. 3 shows a more detailed depiction of the anomaly detection unit 200 from FIG. 2. The anomaly detection unit 200 can have an input component 310, a memory component 320, a selection component 330, an association component 340 and a decision component 350. The input component 310 and/or the memory component 320 and/or the selection component 330 and/or the association component 340 and/or the decision component 350 can be implemented in hardware or exclusively in hardware. In particular, all of the components 310-350 can be implemented in hardware or exclusively in hardware. Equally, any single one of the components 310-350 can also be implemented in software. The hardware implementation of at least some (particularly time-critical instances) of the components 310-350 can contribute to the anomaly detection unit 200 being able to detect a fault and output an appropriate warning particularly quickly, particularly in real time and in a predefined, deterministic cycle.

The input component 310 can be designed to capture an input variable, e.g. from the communication component 210. According to one example, the input component 310 can also correspond to the communication component 210 of the control unit 110. The input variable can contain state information for at least one component of the motor vehicle, e.g. measured values for a characteristic quantity measurable in the vehicle or measured values of a sensor or control values of an actuator or the memory state of a memory, etc. By way of example, such a measured value of a sensor can be a temperature measured value, a measured rotation speed, a selected gear, a brake pressure, a vehicle speed, a radar signal, etc. The input variable can also contain information about a process, i.e. an activity in the communication network 100. An example of such an activity is transmission or reception of a message.

According to one example, the state information can comprise one or more from information about a network activity, information about a change of state of the least one component of the motor vehicle and a sensor measured value. The state information can be time-variant, i.e. e.g. a sensor can deliver different sensor measured values over the course of time.

If the communication network 100 has an Ethernet protocol, the input variable can comprise e.g. one or more of the following:

- Level 2 frames dropped, received, sent or rejected,
- VLAN tag used, removed or classified,
- Level 3 IP address classified, used or translated,
- Level 4 TCP/UDP port address classified,
- Level 2, 3, 5 (security): MacSec, IpSec, (D)TLS authentication reports, DoS reports, OoB alarms, and
- Fault reports, e.g. about a memory failure.

The memory component 320 can be designed to store state values based on the input variable. The memory component 320 can comprise at least one register, e.g. at least one hardware register. According to one example, the memory component 320 comprises a dedicated counter for each input variable to be monitored. The counter can be designed to count up by one whenever the respective input variable is captured, e.g. for every dropped level 2 frame, or for every reported memory failure, or every time a particular pressure is measured in a shock absorber. The reading on the respective counter can be referred to as the respective state value below.

The selection component 330 can be designed to select selected state values from the stored state values. The selection can be dependent on the present configuration of the anomaly detection unit. The selection can comprise causally related parameters, e.g. sensor values and status values from components of the motor vehicle that are involved in a braking process. The selection can comprise parameters that come from locally coincident components of the motor vehicle, e.g. from the front part or from the rear part or from one side of the motor vehicle. The selection can comprise parameters that come from functionally related components of the motor vehicle, e.g. from the brake system or from the alternator or from an airbag.

Figure 4A:
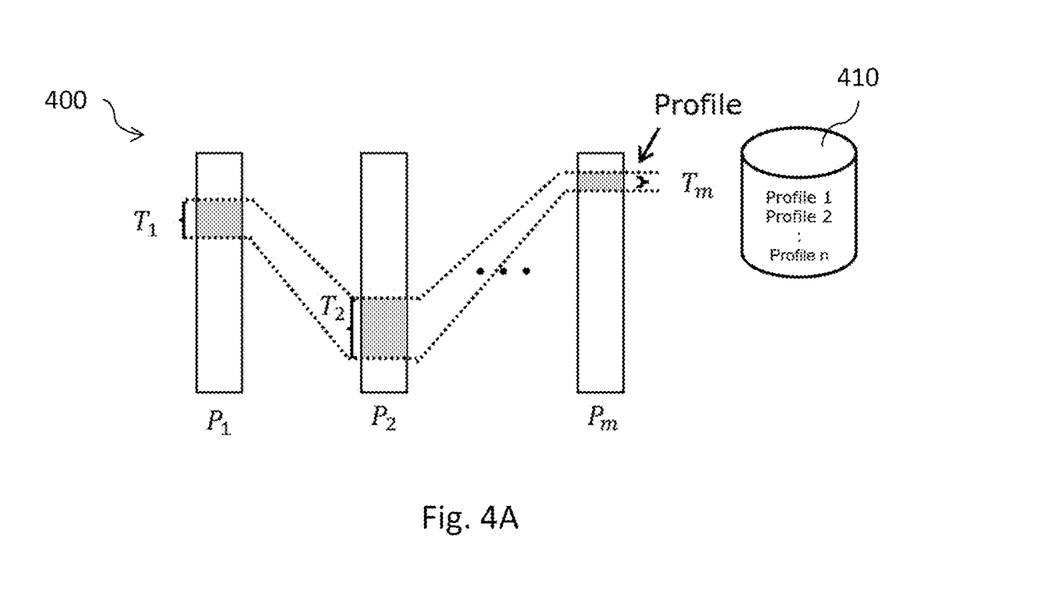
FIG. 4A shows, in outline form, an example of a profile as can be used by an anomaly detection unit.

FIG. 4A shows an example 400 of a selection of parameters $P_1, P_2, \ldots, P_m$ that can be selected from the stored parameters by the selection component 330. For each of the parameters $P_1, P_2, \ldots, P_m$, predefined values $T_1, T_2, \ldots, T_m$ are shown that define a standard range in which the respective parameter should be on the basis of the present status of the motor vehicle. E.g. the state value of the parameter $P_1$ can show how often a pressure of 5 bar occurs in a shock absorber, and the predefined value $T_1$ can stipulate how frequently this pressure should normally occur during a particular braking process.

The predefined values $T_7, T_2, \ldots, T_m$ can be stored in the memory component 320 as a profile. The memory component can store a multiplicity of such profiles 410. The anomaly detection unit 200 can be designed so that the profiles can be updated, e.g. by updates received from the communication network 100. The anomaly detection unit 200 can also be of self-learning design.

The association component 340 can be designed to associate the state values of the parameters $P_1, P_2, \ldots, P_m$ with the predefined values $T_1, T_2, \ldots, T_m$. The associating can comprise a comparison of the state values of the parameters $P_1, P_2, \ldots, P_m$ with the predefined values $T_1, T_2, \ldots, T_m$. According to one example, the anomaly detection unit 200 can also have more than one association component 340, e.g. one association component 340 per parameter $P_1, P_2, \ldots, P_m$.

For example, the result of the associating that can be established by the association component is that a respective state value is concordant with the respective predefined value, is within a selected range, has a particular difference in comparison with the predefined value, etc. The association component 340 can produce an output based on the result of the association.

According to one example, the output is a simple yes/no statement indicating whether the state value is concordant with the respective predefined value or is within a selected range. According to another example, the output is a number from a predefined range (e.g. 0-5), wherein the magnitude of the number indicates by how much the state value is concordant with or differs from the respective predefined value.

Figure 4B:
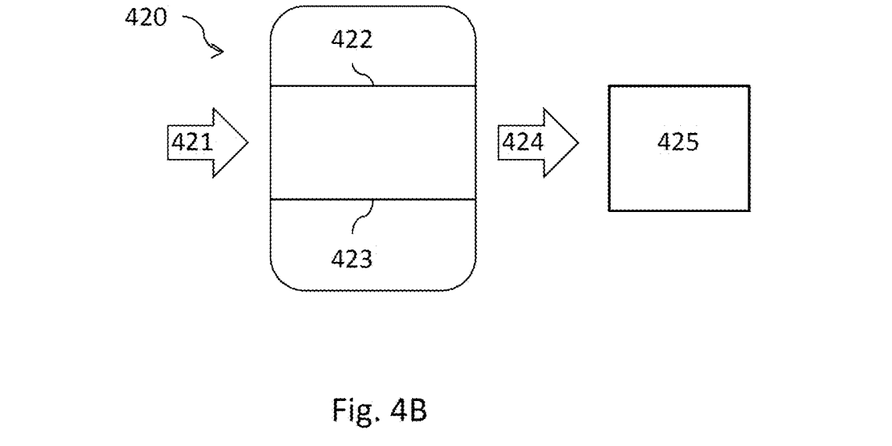
FIG. 4B shows, in outline form, a detector that may be part of an association component of an anomaly detection unit.

According to one example, the association component 340 can have a detector 420 (cf. FIG. 4B). The detector 420 can comprise a comparator, in particular a subtractor. The detector 420 can be configurable. E.g. a variable and an offset to be used for the detector 420 can be configurable. In particular, the detector 420 can be designed to use one of the predefined values $T_1, T_2, \ldots, T_m$.

The comparator can be designed to compare state values with predefined values, e.g. in order to establish whether the state value is within a standard range. If the comparator is a subtractor, the subtractor can be designed to deduct the offset from the state value. In this manner, the detector 420 can be embodied with a smaller size than if the offset were not deducted (e.g. just 16 bits instead of 32 bits). The subtractor can be a hardware subtractor and can be realized as a digital circuit.

As shown in FIG. 4B, the detector 420 can be designed to receive 421 a state value selected by the selection component 330 from the memory component 320, to associate this state value with the predefined value and to output a result 424 of this associating. The associating can comprise a comparison of this state value with the predefined value (to be more precise with an upper limit 422 and a lower limit 423).

The detector 420 can be designed to output the result 424 in the form of a vector 425. According to one example, the vector can have a Boolean value (state value within the predefined values, or not), and, according to another example, the vector can have a numerical value (the value after the subtraction).

Figure 4C:
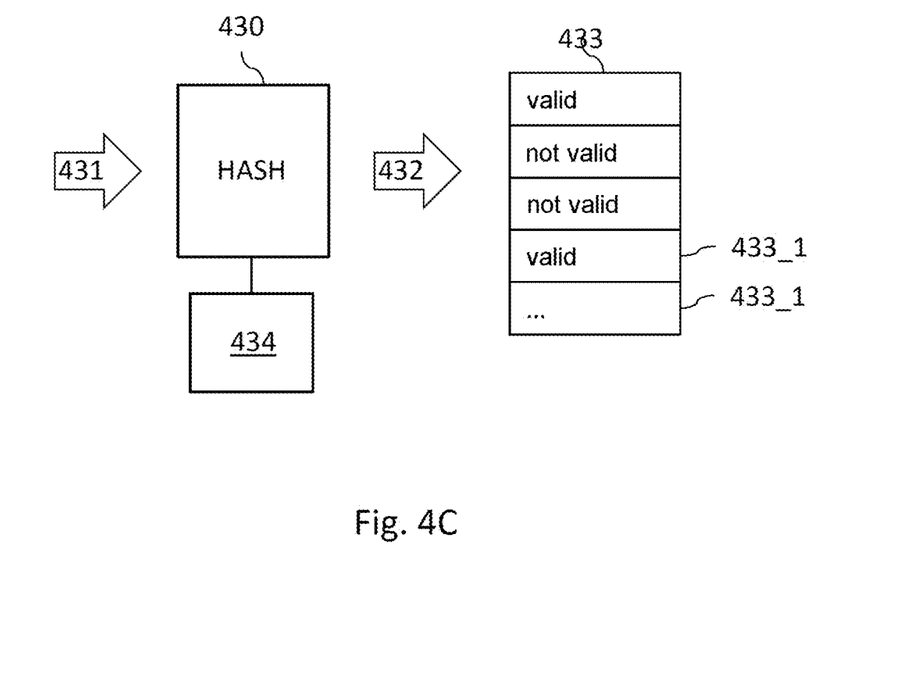
FIG. 4C shows, in outline form, a filter that implements a hash algorithm and may be part of an association component of an anomaly detection unit.

According to another example, the association component 340 can have a filter 430 (cf. FIG. 4C). The filter 430 can comprise a content addressable memory, also associative memory, (CAM). In an associative memory, a memory content is accessed by means of the input of a memory value, as a result of which the association can advantageously take place particularly quickly.

According to one example, the filter 430 can be designed to apply a hash algorithm, wherein the hash algorithm is implemented by the CAM. The filter 430 can be designed to receive state values of the selected parameters $P_1, P_2, \ldots, P_m$ from the memory component 320, to apply the hash algorithm to these state values (to compare the state values with the values $T_1, T_2, \ldots, T_m$) and to output the result 432 e.g. in a table 433. The individual entries 433_1 of the table 433 can each contain the result for one of the parameters $P_1, P_2, \ldots, P_m$.

The filter 430 can be designed to apply the hash algorithm in time slots, wherein the time slots are prescribed by a timer 434. The timer 434 can be configurable, and the configuration of the timer 434 can be dependent on the configuration of the anomaly detection unit 200. The timer 343 can prescribe the clock cycle of the system on a chip, and the anomaly detection unit 200 can therefore have the granularity of this clock cycle.

According to one example, the association component 340 can be of redundant design, i.e. the association component 340 can have two mutually independent association components that are both designed to perform the associating described above. The two redundant association components can be of the same type, i.e. they can have the same design or the same technical approach. It is e.g. possible for the association component 340 to have two redundant detectors 420 or two redundant filters 430 that in each case are both designed to process the selected parameters $P_1, P_2, \ldots, P_m$ as described above. Such redundancy can help to minimize the susceptibility to error of the anomaly detection unit 200.

According to a further example, the association component 340 can be of "diverse" design, i.e. the association component 340 has two mutually independent association components that are both designed to perform the associating described above, wherein the two diverse association components are of different type, i.e. they, have a different design or a different technical approach. A "diverse" association component 340 can have e.g. a detector 420 and a filter 430 that are both designed to process the selected parameters $P_1, P_2, \ldots, P_m$ as described above, but the diverse association components 340 react differently to at least one of the parameters P1, P2, . . . , Pm.

Diversity extends the concept of redundancy, since it thereby becomes possible to detect an erroneous association caused by the type of association component used. Diverse association components form the association differently on the basis of the at least one parameter, so that the associations formed by the diverse association components differ from one another, provided that the at least one parameter leaves an operating range. This difference makes it possible to detect that the ascertained association can no longer be trusted on the basis of the at least one parameter.

The association component 340 can be designed to process multiple profiles 410 in parallel, e.g. by means of a multiplicity of detectors 420 and/or a multiplicity of filters 430.

The decision component 350 can be designed to decide whether there is an anomalous behavior in the at least one component of the motor vehicle, based on the association of the association component 340. The decision component 350 can be designed to make the decision based on a number of differences from the normal state, which number is obtained from the associating.

Figure 4D:
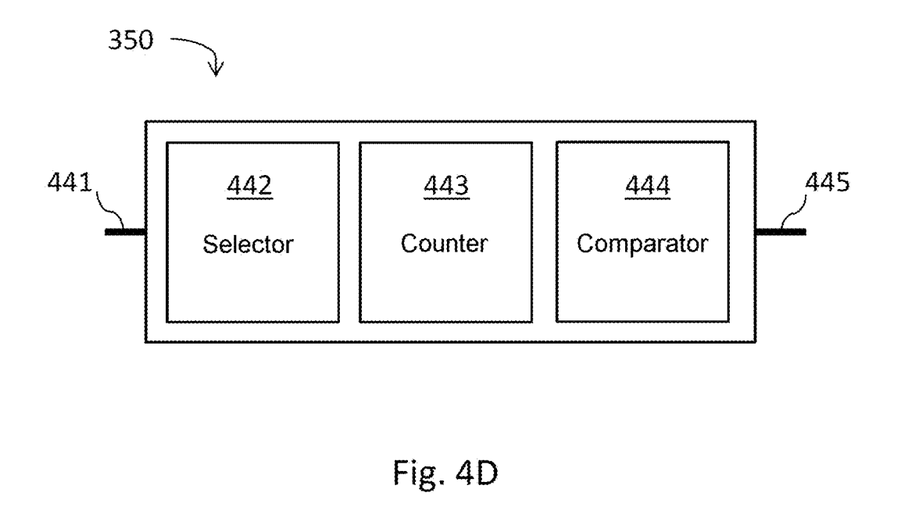
FIG. 4D shows, in outline form, an enlarged depiction of an exemplary decision component of an anomaly detection unit.

FIG. 4D shows an enlarged outline depiction of the decision component 350. The decision component 350 can comprise an input 441 by means of which the decision component 350 is connected to the association component 340 and can receive the result of the associating. According to one example, the decision component 350 can comprise a selector 442 designed to select particular results of the associating from the available results. According to another example, the selector 442 can also be dispensed with and the decision component 350 uses all available results of the associating. The selector 442 can be configurable such that the configuration of the anomaly detection unit 200 is able to determine about which parameters the decision component 350 is supposed to make a decision.

The decision component 350 can comprise a counter 443. The counter 443 can be designed to count how frequently the association component 340 delivers a negative result, i.e. a state value does not correspond to the normal state of the respective component (the state value is outside the value T).

The decision component 350 can comprise a comparator 444. The comparator 444 can be designed to compare whether the count of the counter 443 is within a predefined range (e.g. within a standard range). The comparator 444 can be configurable, e.g. such that the predefined range is stipulated by the configuration of the anomaly detection unit 200.

The decision component 350 can be designed to make a decision regarding whether there is an anomalous behavior in the at least one component of the motor vehicle, based on whether or not the predefined range is exceeded. E.g. the decision component 350 can be configured to decide that there is an anomalous behavior (a fault) in a component of the motor vehicle in the event of more than three or more than four or more than five negative results.

The decision component 350 can comprise an output 445 by means of which the decision can be transmitted to the control unit 110.

According to one example, the decision component 350 can comprise a timer (not shown in FIG. 4D), and the comparator 444 can be designed to perform the comparison with the predefined range within time slots prescribed by the timer. The timer can be configurable. According to one example, the timer can also be identical to the timer 434 of the association component 340.

The decision component 350 can be designed to receive the association result of multiple redundantly or diversely designed association components (cf. above), to process them in parallel or series and to establish whether the multiple association components deliver different results. If at least two of the association components deliver different results, the decision component 350 can further be designed to choose between all associations of the multiple association components (i.e. to decide which of the two associations is regarded as correct). A decision about the correctness of the differing associations requires at least three diverse or redundant association components. The decision can then be taken by means of a majority vote. That is to say that if for example two of three of the association components deliver an identical result, it is possible to decide which of the three associations are supposed to be regarded as right and which are supposed to be regarded as wrong. The decision component 350 can e.g. be designed to receive the association result 424 of the detector 420 and the association result 432 of the filter 430 and to process them in parallel or series. If the results 424 and 432 are different, the decision component 350 can be designed to output an alarm and/or to make a decision regarding which of the results 424 and 432 is supposed to be regarded as correct, as described above.

According to one example, the anomaly detection unit 200 can be of redundant design such that two process paths that are separate from one another are provided, by means of which a respective anomaly can be detected. E.g. the anomaly detection unit 200 can have two memory components 320 and/or two selection components 330 and/or two association components 340, wherein in each case one of the components is assigned to one of the process paths. The redundant components of the anomaly detection unit 200 can be arranged physically separately from one another (e.g. at different locations on a chip).

Figure 5:
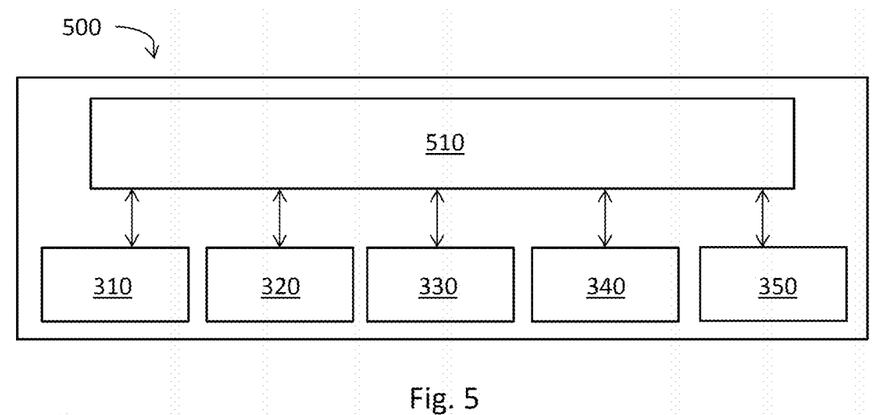
FIG. 5 shows, in outline form, a further example of an anomaly detection unit that has a test component.

FIG. 5 shows an anomaly detection unit 500 that comprises an integrated test component 510 and can otherwise be identical to the anomaly detection unit 200. The test component 510 can be designed to subject each of the components 310-350 to a function test and it can be designed to output the result of the function test via an output. The function test can be performed in real time.

The test component 510 can be designed to produce test vectors or to obtain test vectors, e.g. from the memory component 320, and to apply them to any of the components 310-350. The test component 510 can be designed to receive test vectors from any of the components 310-350 or to send test vectors to any of the components 310-350 at any time.

The function test can be performed during a starting process of the anomaly detection unit 500 or in the course of operation. If the function test is performed in the course of operation, the test component 510 can be designed to apply a correction to the output from the tested components of the components 310-350.

The test component 510 can also be designed to perform a self-test. The test component 510 can transmit its own test vector to the input component 310 in order to report its own status.

The test component 510 can further be designed to perform a test in which a particular number n of additional events is inserted. This number is increased by an absolute value m per freely chosen unit time. The anomaly detection unit will find an anomaly after n±m alterations, regardless of the preset range. This test allows the reaction threshold value of the anomaly detection unit to be characterized by the test component 510.

Figure 6:
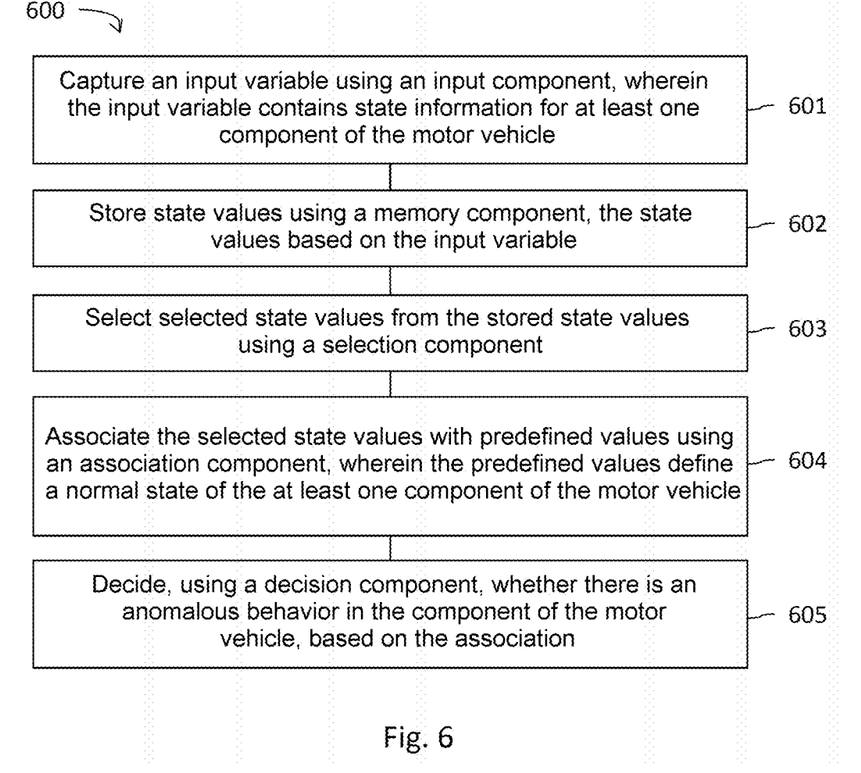
FIG. 6 shows a flowchart for a method for detecting an anomaly in a component of a motor vehicle.

FIG. 6 shows a flowchart for a method 600 for detecting an anomaly in at least one component of a motor vehicle. At 601, the method 600 comprises capturing an input variable using an input component, wherein the input variable contains state information for at least one component of the motor vehicle. At 602, the method 600 comprises storing state values using a memory component, the state values based on the input variable. At 603, the method 600 comprises selecting selected state values from the stored state values using a selection component. At 604, the method 600 comprises associating the selected state values with predefined values using an association component, wherein the predefined values define a normal state of the at least one component of the motor vehicle. At 605, the method 600 comprises deciding, using a decision component, whether there is an anomalous behavior in the at least one component of the motor vehicle, based on the association. According to one example, the input component, the memory component, the selection component, the association component and the decision component are implemented in hardware.

EXAMPLES

Anomaly detection units and method for detecting an anomaly are explained more specifically below using examples.

Example 1 is an electronic anomaly detection unit for use in a motor vehicle, the anomaly detection unit comprising an input component for capturing an input variable, wherein the input variable contains state information for at least one component of the motor vehicle, a memory component for storing state values based on the input variable, a selection component for selecting selected state values from the stored state values, an association component for associating the selected state values with predefined values, wherein the predefined values define a normal state of the component of the motor vehicle, and a decision component for deciding whether there is an anomalous behavior in the at least one component of the motor vehicle, based on the association, wherein one or more of the input component, the memory component, the selection component, the association component and the decision component are implemented in hardware.

Example 2 is the electronic anomaly detection unit according to example 1, wherein the state information comprises a network activity, at least one state parameter of the at least one component or a measured value of a characteristic quantity measurable in the vehicle.

Example 3 is the electronic anomaly detection unit according to example 1 or example 2, wherein the memory component comprises one or more counters.

Example 4 is the electronic anomaly detection unit according to one of the preceding examples, wherein the memory component comprises at least one hardware register.

Example 5 is the electronic anomaly detection unit according to one of the preceding examples, wherein the anomaly detection unit comprises at least two association components and wherein the decision component is designed to detect whether the at least two association components deliver different results.

Example 6 is the electronic anomaly detection unit according to example 5, wherein the decision component for three or more of the association components is designed to choose between associations of two selected association components of the three or more association components if these associations are different, wherein the association of a third association component is taken into consideration for the choice.

Example 7 is the electronic anomaly detection unit according to example 5, wherein the two association components are realized by different, diversified implementations.

Example 8 is the electronic anomaly detection unit according to example 7, wherein the first association component comprises a comparator and wherein the second association component comprises an associative memory.

Example 9 is the electronic anomaly detection unit according to one of the preceding examples, wherein the decision component is designed to make the decision based on a number of differences from the normal state, which number is obtained from the association.

Example 10 is the electronic anomaly detection unit according to one of the preceding examples, wherein the decision component comprises a counter designed to count how frequently the association component for one of the selected state values establishes that said state value is outside its predefined value.

Example 11 is the electronic anomaly detection unit according to example 10, wherein the decision component further comprises a comparator designed to compare whether a count of the counter is within a predefined range.

Example 12 is the electronic anomaly detection unit according to one of the preceding examples, wherein the anomaly detection unit further comprises a test component designed to subject any of the input component, memory component, selection component, association component and decision component to a function test.

Example 13 is the electronic anomaly detection unit according to one of the preceding examples, wherein the selection comprises state values that come from functionally related components of the motor vehicle or from locally coincident components of the motor vehicle or wherein the state values are causally related.

Example 14 is the electronic anomaly detection unit according to one of the preceding examples, wherein the anomaly detection unit is configurable by means of profiles that can be stored in the memory component.

Example 15 is the electronic anomaly detection unit according to example 13, wherein the profiles each define which state values are selected by the selection component and wherein the profiles define the predefined values to be used by the association component.

Example 16 is the electronic anomaly detection unit according to one of the preceding examples, wherein the anomaly detection unit is implemented in a microcontroller unit of the motor vehicle.

Example 17 is the electronic anomaly detection unit according to one of the preceding examples, wherein the input variable comprises data according to an Ethernet protocol.

Example 18 is the electronic anomaly detection unit according to one of the preceding examples, wherein the anomaly detection unit is designed to detect the anomalous behavior in a predefined, deterministic cycle.

Example 19 is a method for detecting an anomaly in at least one component of a motor vehicle, the method comprising capturing an input variable using an input component, wherein the input variable contains state information for at least one component of the motor vehicle, storing state values using a memory component, the state values based on the input variable, selecting selected state values from the stored state values using a selection component, associating the selected state values with predefined values using an association component, wherein the predefined values define a normal state of the at least one component of the motor vehicle, and deciding, using a decision component, whether there is an anomalous behavior in the at least one component of the motor vehicle, based on the association.

Example 20 is the method according to example 19, wherein one or more of the input component, the memory component, the selection component, the association component and the decision component are implemented in hardware.

Example 21 is the electronic anomaly detection unit according to example 1, wherein the association component comprises an associative memory.

Example 22 is the electronic anomaly detection unit according to example 21, wherein the associative memory implements a hash algorithm.

Example 23 is the electronic anomaly detection unit according to example 21, wherein the associative memory implements an error correcting code.

Example 24 is the electronic anomaly detection unit according to example 1, wherein the association component comprises a comparator.

Example 25 is the electronic anomaly detection unit according to example 24, wherein the comparator comprises a subtractor.

Example 26 is the electronic anomaly detection unit according to example 12, wherein the test component is further designed to subject itself to a self-test.

Example 27 is the electronic anomaly detection unit according to example 16, wherein the microcontroller unit is a node of a communication network of the motor vehicle.

Although specific embodiments have been depicted and described herein, it is obvious to a person of average skill in the art that a multiplicity of alternative and/or equivalent implementations can replace the specific embodiments shown and described without departing from the scope of the present disclosure. This application is intended to cover all adaptations or variations of the specific embodiments discussed here. Therefore, the intention is for this disclosure to be restricted only by the claims and the equivalents thereof.

What is claimed is:

1. An electronic anomaly detection unit for use in a vehicle, the electronic anomaly detection unit comprising:
a selection component configured to monitor a current configuration of the electronic anomaly detection unit, wherein the current configuration of the electronic anomaly detection unit changes with a change in state of the vehicle,
wherein the selection component is configured to select a state parameter for monitoring from a plurality of stored state parameters based on the current configuration of the electronic anomaly detection unit;
an association component configured to select a predefined value range from a plurality of predefined value ranges based on the current configuration of the electronic anomaly detection unit and associate the selected state parameter with the selected predefined value range to form a first association, wherein the selected predefined value range defines a normal state of at least one component of the vehicle according to the current configuration of the electronic anomaly detection unit,
a counter associated with a counter threshold that is configurable, wherein the counter is configured to monitor any one of the plurality of stored state parameters, and wherein the counter is configured to count a number of discrete events during which an anomaly associated with the selected state parameter occurs,
wherein the association component is configured to configure the counter threshold by selecting a counter threshold value for the counter threshold based on the current configuration of the electronic anomaly detection unit corresponding to the selected state parameter, wherein the counter threshold value changes with a change in the current configuration of the electronic anomaly detection unit;
an input component configured to receive an input value corresponding to the selected state parameter, wherein the input value contains state information for the at least one component of the vehicle; and
a decision component configured to compare the input value to the selected predefined value range, increase a counter value of the counter for each instance the input value exceeds the selected predefined value range indicating an occurrence of the anomaly associated with the selected state parameter, compare the counter value of the counter to the selected counter threshold value, and generate an anomaly error signal when the counter value of the counter is equal to the selected counter threshold value,
wherein one or more of the input component, the selection component, the association component, and the decision component are implemented in hardware.

2. The electronic anomaly detection unit as claimed in claim 1, wherein the state information comprises a network activity, at least one state parameter of the at least one component, or a measured value of a characteristic quantity measurable in the vehicle.

3. The electronic anomaly detection unit as claimed in claim 1, further comprising: a memory component comprising at least one hardware register.

4. The electronic anomaly detection unit as claimed in claim 1, wherein the electronic anomaly detection unit comprises at least two association components, including the association component, and wherein the decision component is configured to detect whether the at least two association components deliver different results.

5. The electronic anomaly detection unit as claimed in claim 4, wherein the electronic anomaly detection unit comprises at least three association components, including the association component, wherein the decision component is configured to choose one association between two associations of a first association component and a second association component of the at least three association components if the two associations are different, wherein the decision component is configured to choose the one association based on an association of a third association component.

6. The electronic anomaly detection unit as claimed in claim 4, wherein the at least two association components are realized by different, diversified implementations.

7. The electronic anomaly detection unit as claimed in claim 6, wherein a first association component of the at least two association components comprises a comparator and wherein a second association component of the at least two association components comprises an associative memory.

8. The electronic anomaly detection unit as claimed in claim 1, wherein the decision component is configured to make a decision based on a number of differences from a normal state, which number is obtained from the first association.

9. The electronic anomaly detection unit as claimed in claim 1, wherein the decision component comprises the counter configured to count how frequently the association component for one of the selected state parameter establishes that the input value is outside its predefined value range.

10. The electronic anomaly detection unit as claimed in claim 9, wherein the decision component further comprises a comparator configured to compare whether a count of the counter is within a predefined counter range.

11. The electronic anomaly detection unit as claimed in claim 1, wherein the electronic anomaly detection unit further comprises:
a test component configured to subject any of the input component, the selection component, the association component, or the decision component to a function test.

12. The electronic anomaly detection unit as claimed in claim 1, wherein the selected state parameters include state parameters that originate from functionally related components of the vehicle, originate from locally coincident components of the vehicle, or are causally related to a common vehicular function.

13. The electronic anomaly detection unit as claimed in claim 1, further comprising a memory component configured to store different profiles corresponding to different configurations of the electronic anomaly detection unit, wherein the electronic anomaly detection unit is configurable by the different profiles that are stored in the memory component.

14. The electronic anomaly detection unit as claimed in claim 13, wherein the different profiles each define which of the plurality of stored state parameters are selected by the selection component for monitoring and wherein the different profiles define the predefined value range to be used by the association component according to the current configuration of the electronic anomaly detection unit.

15. The electronic anomaly detection unit as claimed in claim 1, wherein the electronic anomaly detection unit is implemented in a microcontroller unit of the vehicle.

16. The electronic anomaly detection unit as claimed in claim 1, wherein the input value comprises data according to an Ethernet protocol.

17. The electronic anomaly detection unit as claimed in claim 1, wherein the electronic anomaly detection unit is configured to detect anomalous behavior in a predefined, deterministic cycle.

18. A method for detecting an anomaly in at least one component of a vehicle, the method comprising:
   monitoring a current configuration of an anomaly detection unit, wherein the current configuration of the anomaly detection unit changes with a change in state of the vehicle;
   selecting a state parameter for monitoring from a plurality of stored state parameters based on the current configuration of the anomaly detection unit;
   selecting a predefined value range from a plurality of predefined value ranges based on the current configuration of the anomaly detection unit and associating the selected state parameter with the selected predefined value range to form a first association, wherein the selected predefined value range defines a normal state of at least one component of the vehicle according to the current configuration of the anomaly detection unit;
   selecting a counter threshold for a counter based on the current configuration of the anomaly detection unit that corresponds to the selected state parameter,
      wherein the counter threshold is configurable and changes with a change in the current configuration of the anomaly detection unit,
      wherein the counter is configured to monitor any one of the plurality of stored state parameters, and wherein the counter is configured to count a number of discrete events during which an anomaly associated with the selected state parameter occurs;
   associating the selected counter threshold with the counter;
   receiving an input value corresponding to the selected state parameter, wherein the input value contains state information for the at least one component of the vehicle;
   comparing the input value to the selected predefined value range;
   increasing a counter value of the counter for each instance the input value exceeds the selected predefined value range indicating an occurrence of the anomaly associated with the selected state parameter;
   comparing the counter value of the counter to the selected counter threshold; and
   generating an anomaly error signal when the counter value of the counter is equal to the selected counter threshold.

\* \* \* \* \*